United States Patent
Yamaguchi

(10) Patent No.: US 9,304,000 B2
(45) Date of Patent: Apr. 5, 2016

(54) COOPERATION SYSTEM, NAVIGATION SYSTEM, IN-VEHICLE APPARATUS AND PORTABLE TERMINAL

(75) Inventor: Akihiko Yamaguchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 218 days.

(21) Appl. No.: 13/550,695

(22) Filed: Jul. 17, 2012

(65) Prior Publication Data

US 2013/0030689 A1    Jan. 31, 2013

(30) Foreign Application Priority Data

Jul. 27, 2011   (JP) .................................. 2011-164703

(51) Int. Cl.
G01C 21/20 (2006.01)
G01C 21/36 (2006.01)

(52) U.S. Cl.
CPC .............. *G01C 21/20* (2013.01); *G01C 21/362* (2013.01); *G01C 21/3688* (2013.01)

(58) Field of Classification Search
CPC .. G01C 21/36; G01C 21/3605; G01C 21/362; G01C 21/3661; G01C 21/3688; G01C 21/20
USPC ......................................... 701/409, 430, 457
See application file for complete search history.

(56) References Cited

U.S. PATENT DOCUMENTS

| | | | | |
|---|---|---|---|---|
| 4,891,760 | A * | 1/1990 | Kashiwazaki et al. ........ | 701/456 |
| 7,739,037 | B2 * | 6/2010 | Sumizawa et al. ............ | 701/453 |
| 8,103,450 | B2 * | 1/2012 | Takaoka ........................ | 701/475 |
| 8,406,991 | B2 * | 3/2013 | Ohta et al. .................... | 701/400 |
| 2003/0065440 | A1 | 4/2003 | Oda et al. | |
| 2003/0069686 | A1 * | 4/2003 | Watanabe et al. ............. | 701/200 |
| 2003/0156097 | A1 | 8/2003 | Kakihara et al. | |
| 2006/0064239 | A1 * | 3/2006 | Ishii .............................. | 701/200 |
| 2008/0027643 | A1 * | 1/2008 | Basir et al. .................... | 701/213 |
| 2008/0071475 | A1 * | 3/2008 | Takaoka ........................ | 701/213 |
| 2009/0164110 | A1 * | 6/2009 | Basir ............................. | 701/117 |
| 2009/0315766 | A1 * | 12/2009 | Khosravy et al. ........ | 342/357.07 |
| 2010/0138149 | A1 * | 6/2010 | Ohta et al. .................... | 701/201 |
| 2010/0144398 | A1 | 6/2010 | Abeta | |
| 2011/0047317 | A1 * | 2/2011 | Burkard et al. ............... | 711/103 |
| 2011/0160996 | A1 | 6/2011 | Terai et al. | |
| 2011/0213550 | A1 * | 9/2011 | Ishizuka ........................ | 701/201 |
| 2011/0257973 | A1 | 10/2011 | Chutorash et al. | |
| 2012/0310522 | A1 * | 12/2012 | Nagata et al. ................. | 701/409 |

FOREIGN PATENT DOCUMENTS

JP   2002-022482   1/2002
JP   2003-156340   5/2003

(Continued)

*Primary Examiner* — John Q Nguyen
*Assistant Examiner* — Michael Whalen
(74) *Attorney, Agent, or Firm* — Harness, Dickey & Pierce, P.L.C.

(57) ABSTRACT

A portable terminal executing an application program for realizing a predetermined function may not require a re-input operation of setting information and may reduce a restart time of the predetermined function by way of an in-vehicle apparatus. Specifically, the in-vehicle apparatus acquires and stores the setting information from the portable terminal. When a forced termination of the application program is detected, the in-vehicle apparatus transmits the setting information to the portable terminal after the application program is restarted by the portable terminal. The setting information from the in-vehicle apparatus enables the portable terminal to perform an auto-resetting process for redefining/resetting the setting information in order to resumes the application program.

24 Claims, 6 Drawing Sheets

(56) References Cited

FOREIGN PATENT DOCUMENTS

| JP | 2003-244343 | 8/2003 |
| JP | 2008-292299 | 12/2008 |
| JP | 2010-130672 | 6/2010 |
| JP | 2011-038775 | 2/2011 |
| JP | 2011-137764 | 7/2011 |

\* cited by examiner

COOPERATION SYSTEM, NAVIGATION SYSTEM, IN-VEHICLE APPARATUS AND PORTABLE TERMINAL

CROSS REFERENCE TO RELATED APPLICATION

The present application is based on and claims the benefit of priority of Japanese Patent Application No. 2011-164703, filed on Jul. 27, 2011, the disclosure of which is incorporated herein by reference.

TECHNICAL FIELD

The present disclosure generally relates to a cooperation system that includes an in-vehicle apparatus installed on a movable body and a portable terminal, where the in-vehicle apparatus and the portable terminal are communicably coupled.

BACKGROUND

In recent years, a portable terminal such as a GPS equipped smartphone having an advanced functionality substantially serves as, for example, an in-vehicle navigation apparatus for providing route guidance to a driver. In other words, as disclosed in Japanese patent document JP-A-2011-507078 ('078), the portable terminal can be cooperatively used with an in-vehicle apparatus, displaying, on a display unit of the in-vehicle apparatus, a map screen generated by the portable terminal when, for example, the portable terminal is used in a vehicle and the portable terminal is coupled to an ECU of the vehicle. In such manner, the route guidance is provided to the user of the vehicle even when the in-vehicle apparatus is not equipped with a navigation function.

Further, the function of the portable terminal is not limited to a navigation function, as described above. For instance, the portable terminal used in the vehicle may also serve as an audio/visual player. In any case, when the ECU of the vehicle realizes a function in the above-described manner, such function is dependent on the normal operation of the portable terminal. As a result, when an application on the portable terminal crashes, the portable terminal dependent function, such as the navigation function, is terminated on the vehicle side.

Therefore, after a crash of the application on the portable terminal, the application needs to be resumed or restarted with various parameters and/or information inputted again for a re-execution of the application by the portable terminal, which is cumbersome for the driver/user and a may delay the activation of the function. That is, for example, after the crash of a navigation application, the user needs to input parameters, such as a destination or a waypoint, to set an execution condition of the navigation application, such as a route to the destination. Such re-inputting of the setting information and re-setting the execution condition of the application may be cumbersome for an occupant, especially for a driver of the vehicle.

SUMMARY

In an aspect of the present disclosure, a cooperation system includes a portable terminal and an in-vehicle apparatus, where the in-vehicle apparatus and the portable terminal are communicably coupled.

The portable terminal may execute an application program to perform a predetermined function, where setting information for executing the application program is defined. Based on an execution of the application program by the portable terminal, the in-vehicle apparatus displays, on a display unit, information transmitted from the portable terminal.

The in-vehicle apparatus is configured to include a setting information acquisition unit, a setting information storage unit, and a restart time transmission. The setting information acquisition unit acquires the setting information from the portable terminal when the application program is executed by the portable terminal, and the setting information storage unit stores the setting information acquired. If a forced termination of the application program is occurring, the restart time transmission unit transmits the setting information stored by the setting information storage unit to the portable terminal after the application program is restarted by the portable terminal.

The portable terminal is configured to include a setting information transmission unit and a reset unit. The setting information transmission unit transmits the setting information of the application program to the in-vehicle apparatus. In the event of a forced termination of the application program, the reset unit stores the setting information transmitted from the in-vehicle apparatus, and re-executes the application program in response to the restart time transmission unit of the in-vehicle apparatus.

Conventionally, when the forced termination of the application program occurs, the setting information may have to be inputted again via the portable terminal after the application program is restarted, because the setting information is managed by the portable terminal. Such a re-input may cause a delay in resuming the function of the portable terminal. Further, the re-input operation for re-inputting the setting information is extremely cumbersome for the driver.

In view of the above, in the present disclosure, the setting information set in the portable terminal is stored/backed-up to the in-vehicle apparatus in advance, or, before the crash (i.e., the forced termination) of the application program. Then, if the forced termination is determined, the stored setting information is transmitted back to the portable terminal by the in-vehicle apparatus when application program is restarted by the portable terminal.

In such manner, the setting information may not need to be re-inputted to the portable terminal after the application program is resumed after the forced termination. Accordingly, the restart time (i.e., a waiting time) of the function of application program is reduced, and the user is saved from the cumbersome re-input operation.

The in-vehicle apparatus may include a setting information request unit to request the setting information from the portable terminal. In such a case, the setting information transmission unit of the portable terminal, transmits the setting information to the in-vehicle apparatus in response to the request by the setting information request unit of the in-vehicle apparatus. In such manner, the acquisition timing of the setting information is controlled by the in-vehicle apparatus, which may ensure that the in-vehicle apparatus receives the setting information before a force termination of the application program.

The in-vehicle apparatus may also include a forced termination determination unit for determining whether a forced termination of the application program is occurring. For instance, the forced termination determination unit may determine a force termination is occurring when, based on the application program, the portable terminal is non-responsive. In addition, the forced termination determination unit may determine a force termination is occurring when, based on the application program, the portable terminal is non-responsive despite having an uninterrupted communication connection with the in-vehicle apparatus and/or despite having battery charge level above a critical threshold level.

The above description is in regards to the cooperation system, which realizes a predetermined function in the in-vehicle apparatus by the cooperation of the portable terminal. The predetermined function may thus be realized as a navigation function in such cooperation system. That is, the cooperation system may serve as a navigation system.

The portable terminal of the navigation system executes the application program to realize a navigation function, and the in-vehicle apparatus may display, on the display unit, a map image and current position information transmitted from the portable terminal according to the application program executed. The setting information defined during the execution of the application program may include information, such as a destination or a waypoint, and such information may not have to be re-inputted when the application program is restarted after a forced termination of the application program.

Further, the setting information transmission unit of the portable terminal may transmit, at a predetermined timing, the setting information to the in-vehicle apparatus. In such manner, the in-vehicle apparatus may acquire the setting information without requesting the setting information.

Though the above description describes the present disclosure as a navigation system, the present disclosure may also be realized as the in-vehicle apparatus, or may also be realized as the portable terminal.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

Figure 1:
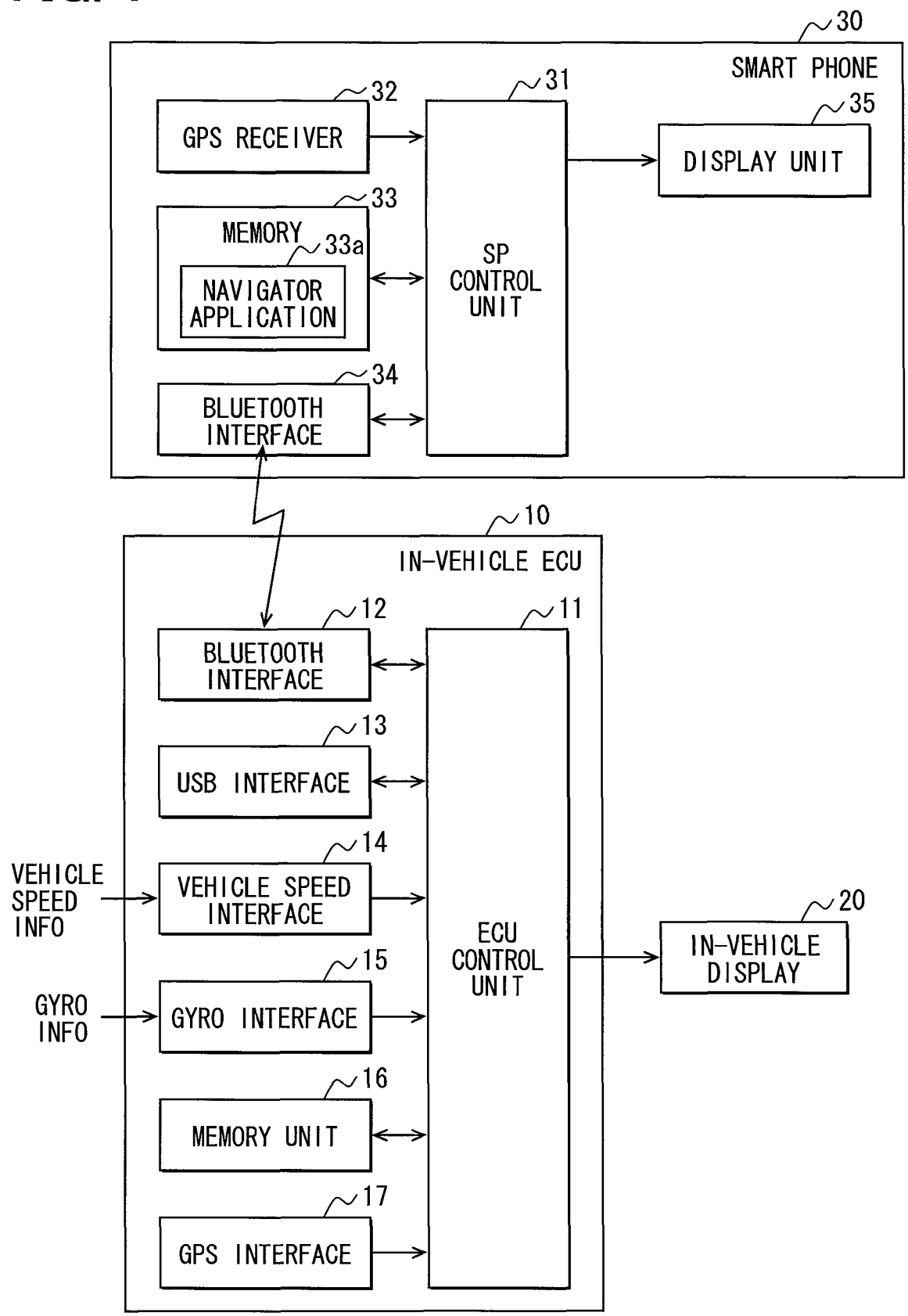
FIG. 1 is a block diagram of a navigation system in of the present disclosure.

An embodiment of the present disclosure is described in the following with reference to the drawings FIG. 1 is a block diagram of a navigation system. The navigation system includes an in-vehicle apparatus 10 disposed in a vehicle, an in-vehicle display 20 connected to an in-vehicle apparatus 10, and a smart phone 30.

The in-vehicle apparatus 10 includes an ECU control unit 11 as its main component. The ECU control unit 11 (e.g., a computer) includes a CPU with a bus line to connect to the CPU, a ROM, a RAM, an input/output, and the like. The ECU control unit 11 is electrically coupled to a Bluetooth interface (i.e., BT-IF) 12, a USB interface (i.e., USB-IF) 13, a vehicle speed interface (i.e., a vehicle speed IF) 14, a gyro interface (i.e., a gyro IF) 15, a memory unit 16 and a Global Positioning System (GPS) interface (i.e., GPS-IF) 17.

The smart phone 30 includes a smart phone control unit (i.e., an SP control unit) 31 as a main component. The SP control unit 31 (e.g., a computer) includes a CPU, a ROM, a RAM, and an input/output, as well as a bus line to connect these components, similar to the ECU control unit 11. The SP control unit 31 is electrically coupled to a GPS receiver 32, a memory 33, a Bluetooth interface (i.e., BT-IF) 34, and a display unit 35.

By the configuration described above, the in-vehicle apparatus 10 and the smart phone 30 respectively perform data communication via the BT-IF 12 and the BT-IF 34 in the present embodiment. Specifically, a navigator application 33A is installed in the memory 33 of the smart phone 30, and a map image and a position are transmitted from the smart phone 30 to the in-vehicle apparatus 10 by the navigator application 33A via the BT-IF 34. In such manner, the in-vehicle apparatus 10 performs route guidance by displaying the information received on the in-vehicle display 20.

The BT-IF 12 and the USB-IF 13 of the in-vehicle apparatus 10 are used for data communication with the smart phone 30. Therefore, data communication with the smart phone 30 may be performed via wireless connection, through the BT-IF 12, and wired connection, through the USB-IF 13.

The vehicle speed IF 14 is used to input vehicle speed information from other ECUs (not illustrated). The gyro IF 15 is used to input gyro information, which includes information regarding a vehicle rotation and a change of vehicle direction from the other ECUs (not illustrated).

The memory unit 16 is realized, for example, as a memory device or a hard disk drive (HDD). The memory unit 16 stores a setting information of the navigator application 33A of the smart phone 30 and a map image, which is described later.

The GPS-IF 17 is used to input GPS information. Further, in the present embodiment, a GPS receiver 32 of the smart phone 30 is utilized for the acquisition of GPS information. That is, the GPS-IF 17 is not used for the input of the GPS information.

The in-vehicle display 20 is a liquid crystal display device to provide information to a user, such as a vehicle driver. The in-vehicle display 20 may display a current vehicle position as well as a map image and a guidance route. Further, though the in-vehicle display 20 is described as "connected" to the in-vehicle apparatus 10 in the present embodiment (i.e., in the above), the in-vehicle display 20 may be incorporated within or in the in-vehicle apparatus 10.

The GPS receiver 32 of the smart phone 30 receives an electric wave from a GPS satellite for the acquiring a position of the smart phone 30. In the present embodiment, the smart phone 30 is used within a vehicle, and, therefore, acquires the current position of the vehicle.

The memory 33 may be implemented as a non-volatile memory unit. In the memory 33, information to be used by the navigator application 33A is stored. Further, the map image used by the navigator application 33A is stored in the memory 33.

The BT-IF 34 establishes a communication link with the in-vehicle apparatus 10 via the BT-IF 12 of the in-vehicle apparatus 10 for data transmission and reception, so that the smart phone 30 and the in-vehicle apparatus 10 are communicably coupled.

The display unit 35 of the smart phone 30 is a liquid crystal display to display information. Further, the display unit 35 has a touch panel integrated thereon, allowing a touch operation of the smart phone 30. At the time of first startup of the navigator application 33A, input of the setting information is performed through the touch panel.

The navigation system may be realized when the smart phone 30 is brought into the vehicle, where the smart phone 30 is executing the navigator application 33A, and the smart phone 30 and the in-vehicle apparatus 10 are communicably coupled. In the following, a setting information acquisition process performed by the in-vehicle apparatus 10 is described.

Figure 2:
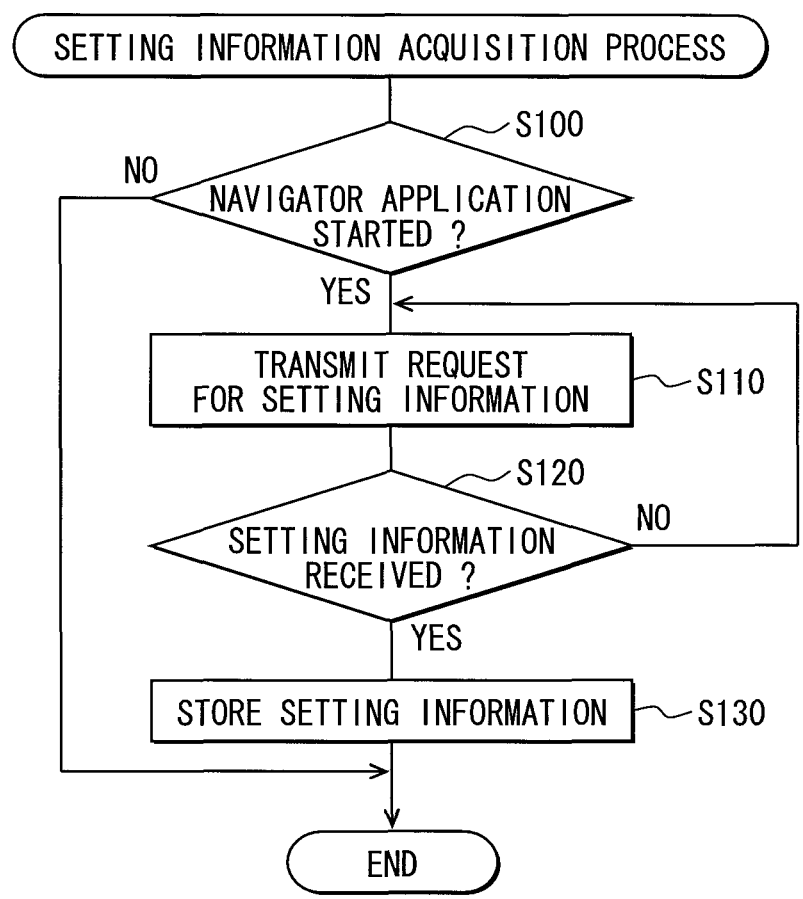
FIG. 2 is a flowchart of a setting information acquisition process of an in-vehicle apparatus.

FIG. 2 is a flowchart of the setting information acquisition process performed by the ECU control unit 11 of the in-vehicle apparatus 10 at the time of establishing data communication after the startup of the navigator application 33A by the smart phone 30.

First, in S100, the process determines whether the navigator application 33A has been executed (i.e., has been started). The process determines whether the navigator application 33A is responsive or not by performing data communication with the smart phone 30. When it is determined that the navigator application 33A has been executed or has started (S100:YES), the process proceeds to S110. When it is determined that the navigator application 33A is not starting up (S100:NO), the setting information acquisition process is finished without performing the subsequent processes.

In S110, the process requests the setting information from the smart phone 30. The setting information is information that is set or defined in the smart phone 30 by a user before performing route guidance. Such setting information may include information regarding a destination, a waypoint, and/or an already-set route.

In S120, the process determines whether the setting information has been received. Specifically, the process determines whether the in-vehicle apparatus 10 has received the setting information from the smart phone 30 in response to the request of S110. When it is determined that the setting information has been received (S120:YES), the process proceeds to S130. When it is determined that the setting information has not been received (S120:NO), the process returns to S110 to re-request the setting information.

In S130, the process stores the setting information from the smart phone 30 in the memory unit 16 of the in-vehicle apparatus 10. After S130, the setting information acquisition process concludes itself.

Figure 3:
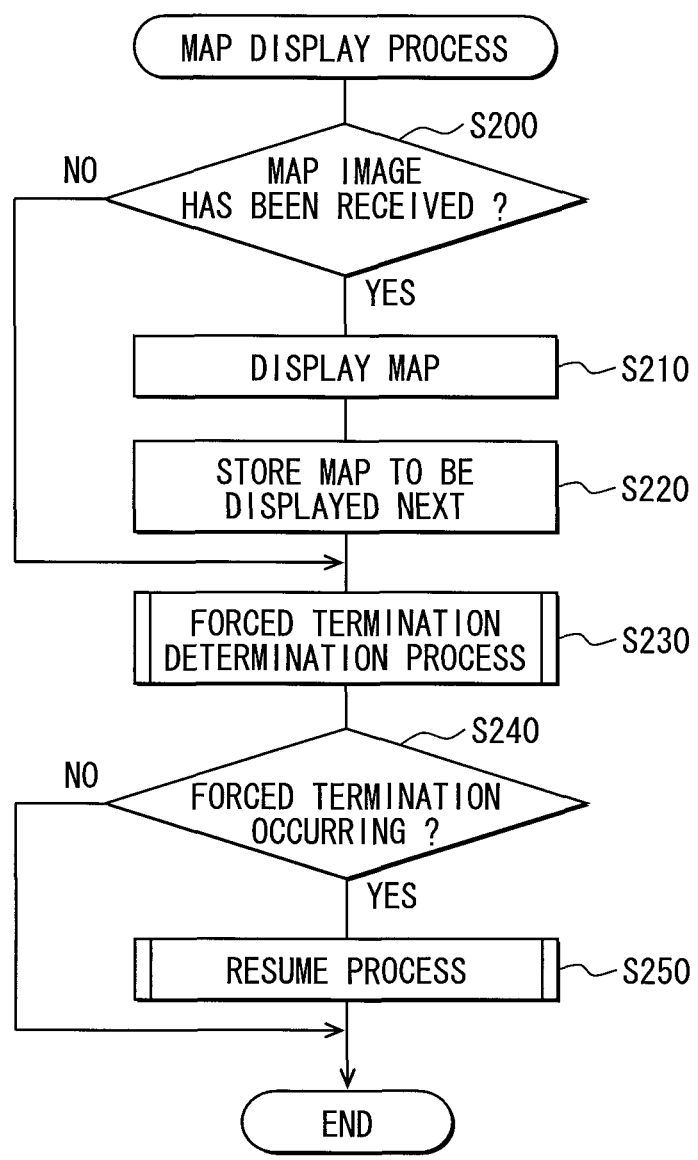
FIG. 3 is a flowchart of a map display process of the in-vehicle apparatus.

With reference to FIG. 3, a map display process performed by ECU control unit 11 of the in-vehicle apparatus 10 for displaying a map is described in the following. When the navigator application 33A is initiated in the smart phone 30 and the route guidance is performed, a map image including information of the current position of the vehicle is transmitted regularly from the smart phone 30 to the in-vehicle apparatus 10. The map display process displays a map based on the transmitted map image.

First in S200, the process determines whether a map image has been received. When it is determined that a map image has been received (S200:YES), the process proceeds to S210. When it is determined that a map image has not been received (S200:NO), the process proceeds to S230.

In S210, the process displays a map. That is, the process shows, on the in-vehicle display 20, a map image for display. In other words, a portion of the received map image is put up on the display 20. Such a map image includes the current position information. Therefore, the map image for display includes the current position of the vehicle.

In S220, the process stores a map to be displayed next. The map image transmitted from the smart phone 30 includes an area that is bigger than the map image for display (i.e., the map image appearing on the in-vehicle display 20). Therefore, the process stores, in the memory unit 16, the map image which may be displayed in the future. In such manner, even when the map image transmission is interrupted, for example, the display of the map image can be continued for a certain period. After processing S220, the process proceeds to S230.

Figure 4:
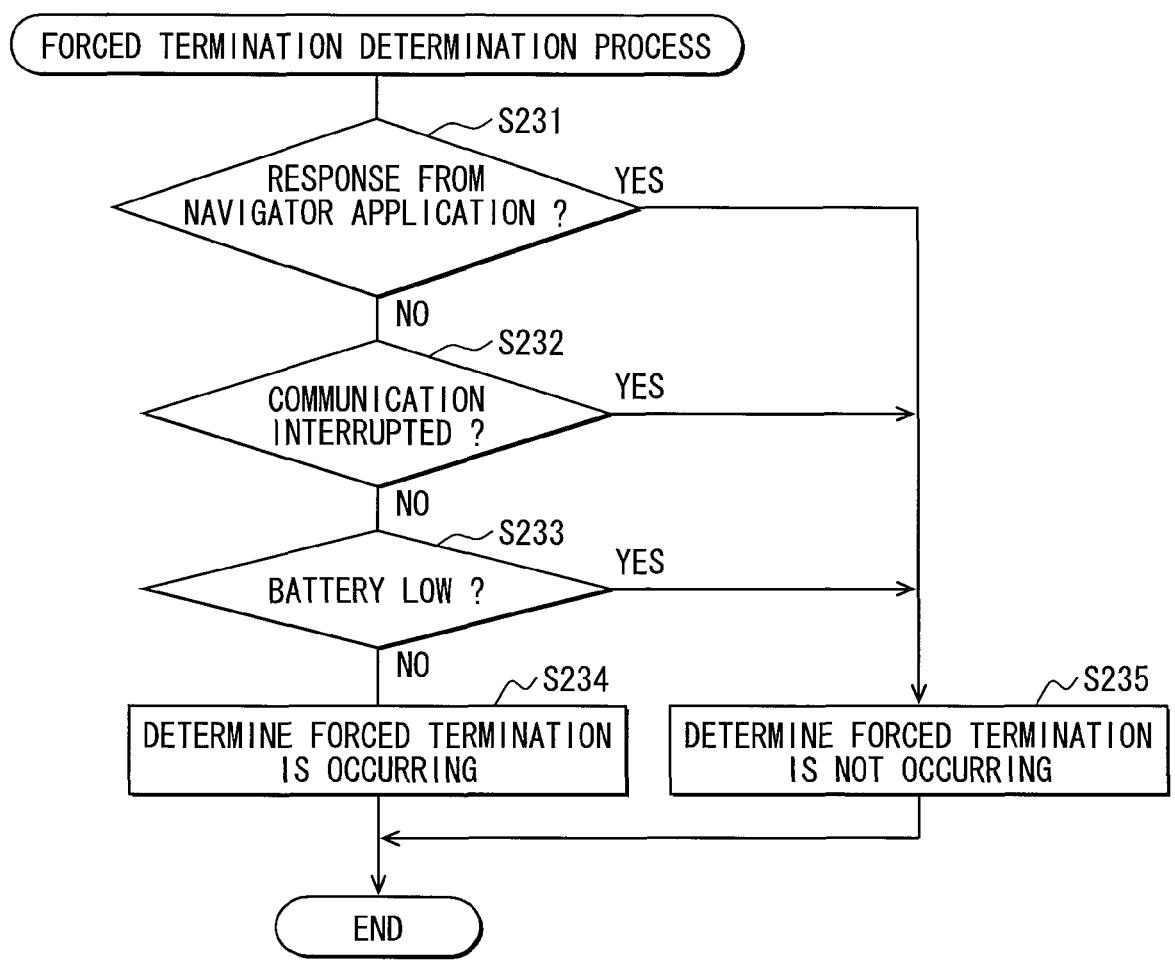
FIG. 4 is a flowchart of a forced termination determination process of the in-vehicle apparatus.

In S230, which comes after S220 or comes after negative determination in S200, a forced termination determination process is performed by the in-vehicle apparatus 10. FIG. 4 is a flowchart of the forced termination determination process. The forced termination determination process is explained in the following.

First in S231, the process determines whether there is a response from the smart phone 30 based on the operation of the navigator application 33A. During the startup time of the navigator application 33A, data communication between the smart phone 30 and the in-vehicle apparatus 10 is performed regularly through the BT-IF 12 and BT-IF 34 (i.e., communication link). Thus, when it is determined that there is a response based on the operation of the navigator application 33A (S231:YES), it is determined that a forced termination is not occurring in S235, and the forced termination determination process concludes itself. When it is determined that there is no response based on the operation of the navigator application 33A (S231:NO), the process proceeds to S232.

The process determines, in S232, whether communication is interrupted. That is, the data communication through the BT-IF 12 and BT-IF 34 may be interrupted, depending on the condition of the electric wave (i.e., interruption in a communication link). Therefore, based on the signal from the BT-IF 12, the process determines whether communication is interrupted. Note that the interruption of the communication link is not a "forced termination" of the navigator application 33A. When it is determined that communication is interrupted (S232:YES), it is determined, in 235, that a forced termination is not occurring, and the forced termination determination process concludes itself. When it is determined that communication is not interrupted (S232:NO), the process proceeds to S233.

The process then determines whether the battery of the smart phone 30 is in a low battery condition in S233. When the charge level of the battery is below a certain value (i.e., below a critical threshold), the SP control unit 31 of the smart phone 30 transmits a signal indicating a low battery condition. Note that the low battery condition is not a forced termination of the navigator application 33A. When it is determined that the battery is in a low battery condition (i.e., critical battery charge) (S233:YES), it is determined in S235 that a forced termination is not occurring, and the forced termination determination process concludes itself. When it is determined that the battery is not in a low battery condition (i.e., non-critical battery charge) (S233:NO), it is determined in S234 that a forced termination is occurring, and then the forced termination determination process concludes itself.

Therefore, when there is no response based on the navigator application 33A (S231:NO) and the communication is not interrupted (S232:NO) and the battery of the smart phone 30 is not low (S233:NO), it is determined that a forced termination of the navigator application 33A is occurring.

Returning to FIG. 3, in S240, the process determines whether a forced termination is occurring. Based on FIG. 4, when it has been determined that a forced termination is occurring, then S240 is affirmative (S240:YES) and the process performs a resume process in S250, and then the map display process concludes itself. When it is determined that a forced termination is not occurring (S240:NO), the map display process then concludes itself without performing process in S250.

Figure 5:
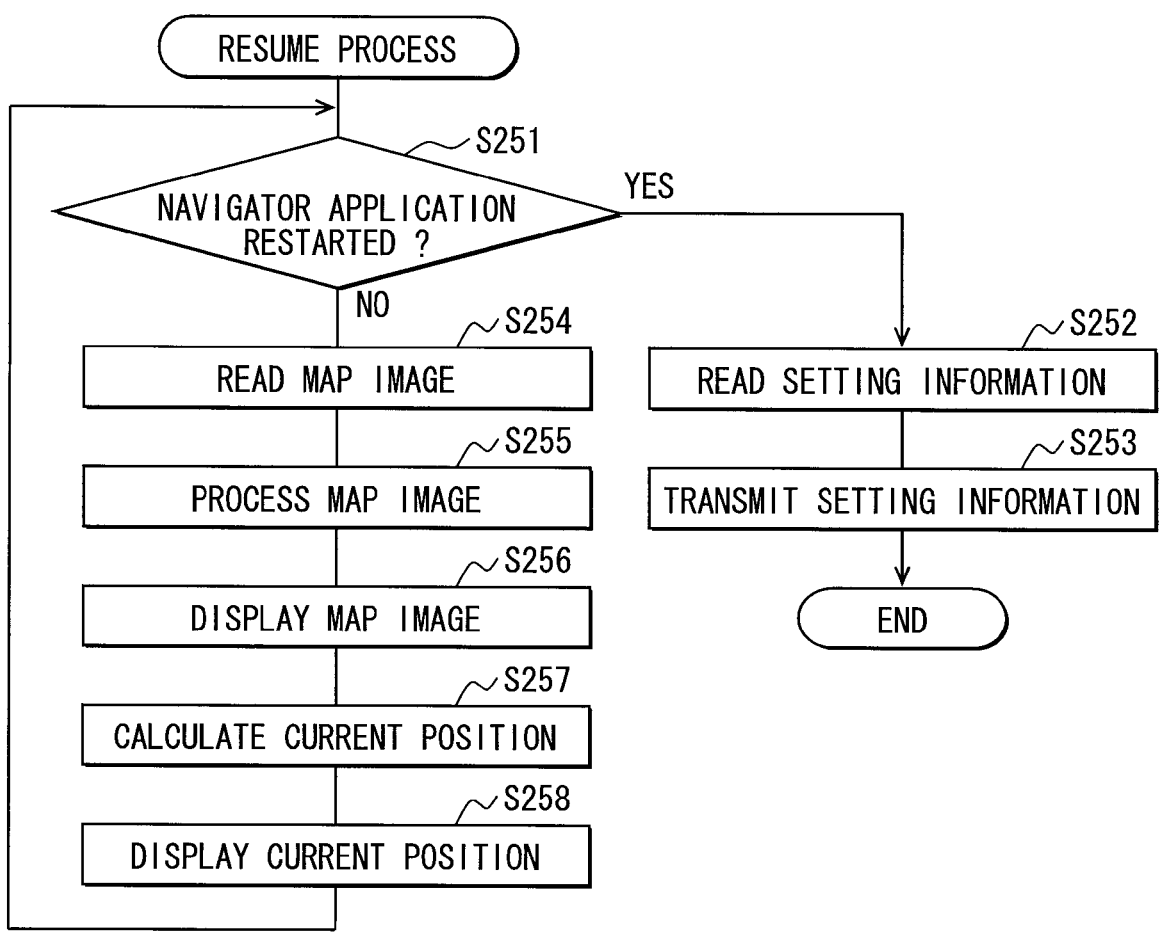
FIG. 5 is a flowchart of a resume process of the in-vehicle apparatus.

FIG. 5 is a flowchart of the resume process of S250 performed by the in-vehicle apparatus 10.

First in S251, the process determines whether the navigator application 33A has restarted or not. When the forcedly terminated navigator application 33A has restarted, a signal indicating such situation is transmitted from the SP control unit 31 of the smart phone 30. Thus, when it is determined that the navigator application 33A has restarted (S251:YES), the process proceeds to S252. When it is determined that the navigator application 33A has not restarted (S251:NO), the process proceeds to S254.

In S252, which comes after the restart of the navigator application 33A, the process retrieves/reads the setting information from the memory unit 16. That is, the process begins to read the setting information that was stored in S130 of the setting information acquisition process of FIG. 2. The setting information includes information, such as, a destination, a waypoint, and/or a guidance route, which was defined before the occurrence of the force termination as described above.

In S253, the process transmits the setting information that it retrieved in S252 to the smart phone 30. In such manner, the smart phone 30 is enabled to acquire the setting information after the forced termination of the navigator application 33A from the in-vehicle apparatus 10, where the setting information is information set/defined before the occurrence of the forced termination. After S253, the resume process concludes itself.

In S254, which comes after no-restarting of the navigator application 33A, the process begins to read the map image. Specifically, the process begins to read the map image, which was stored in S220 of the map display process of FIG. 3.

In S255, the already-read map image is processed. For example, the process changes a color of the map image, or the process makes a new map image, which includes a text message superposed on the original map image. In other words, the processed map image is used to clearly show that the image is a temporary one, in case of the forced termination of the navigator application 33A, which disables the regular transmission of the map image from the smart phone 30, thereby leading to the use of pre-stored map image that has been read in S254. That is, for the purpose of emphasizing that the navigator application 33A is currently not usable, the color of the map image may be changed, or a warning message such as "Application is forcedly terminated. The displayed map is a pre-stored one, and may be different from a current version. Wait for a moment." may be inserted in the map image.

In S256, the process displays the map image. That is, the process displays, on the in-vehicle display 20, the processed map image processed in S255.

Then, in S257, the process calculates the current position. That is, the process calculates/estimates, by using a dead-reckoning navigation, the current position of the vehicle based on the current position of the vehicle before the forced termination of the navigator application 33A (i.e., a pre-forced-termination current poison), by utilizing vehicle speed information that is provided by the vehicle speed IF 14 and gyro information that is provided by the gyro IF 15.

Then, in S258, the process displays the current position calculated in S257 in a superposing manner on the map. Since such a display of the current position is only temporary, the user is warned that the displayed map image is a temporary one based on a different display mode that is different from the normal display mode during a normal operation of the smart phone 30. That is, for example, the map image may have a different color that is different from the normal color used at a time of the normal operation of the smart phone 30. The map image may also have a different size from the normal size, or may have a different display manner, such as a blinking display or the like. For example, some object on the map displayed in a blinking manner at the normal operation time may be displayed in a non-blinking manner in this case.

After processing S258, the process returns to S251 to repeat the process.

Figure 6:
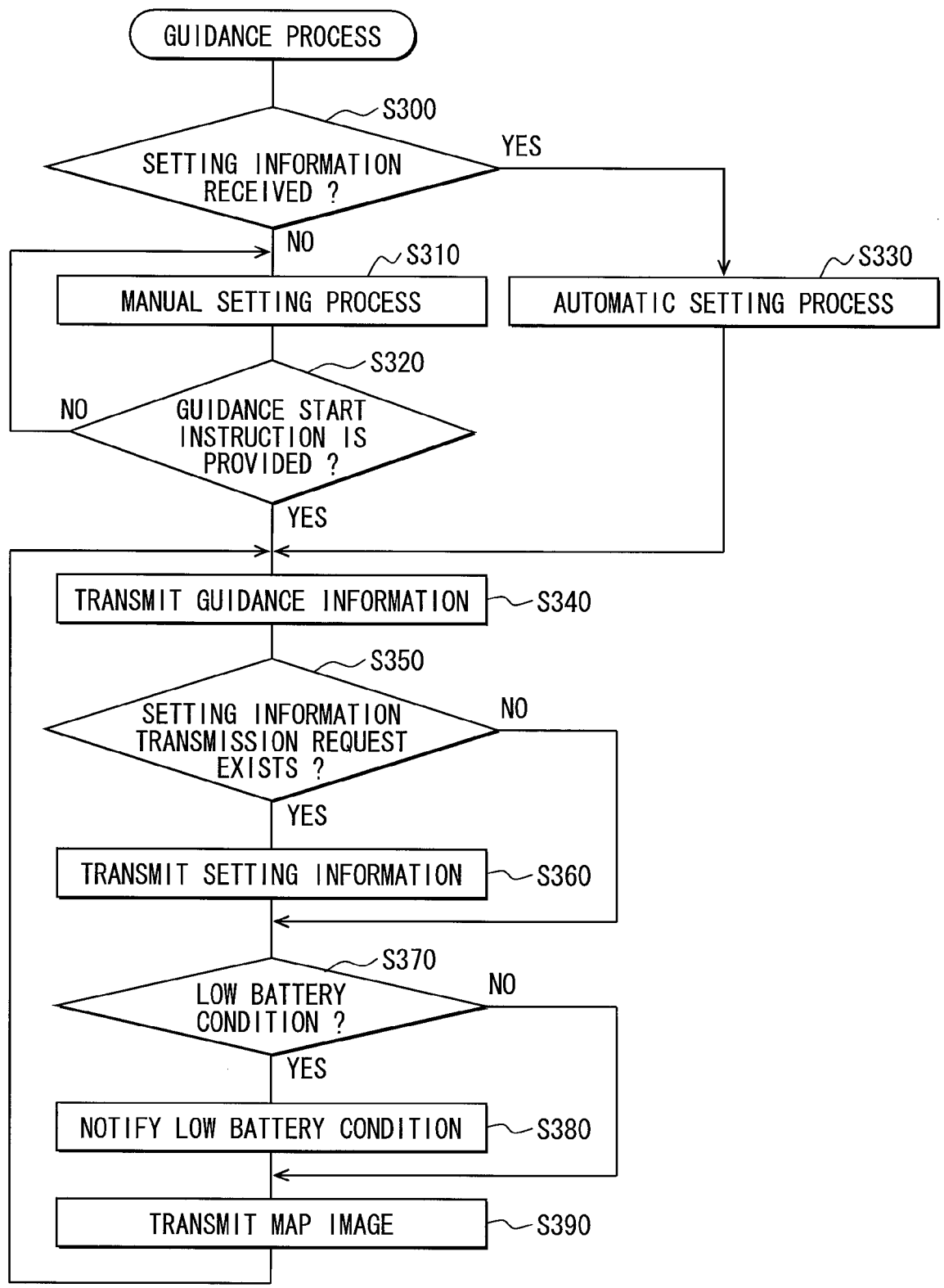
FIG. 6 is a flowchart of a guidance process of a smart phone.

With reference to FIG. 6, a guidance process performed by the smart phone 30 is described in the following. The guidance process is performed by the SP control unit 31 based on the operation of the navigator application 33A.

The process determines, first in S300, whether the setting information has been received. The process in S300 corresponds to S253 of FIG. 5. When the navigator application 33A is forcedly terminated, the setting information such as a destination and the like is transmitted from the in-vehicle apparatus 10 to the smart phone 30. Then, if it is determined that the setting information has been received (S300:YES), the process performs an automatic setting process for setting the setting information in S330, and the process proceeds to S340. When it is determined that the setting information has not been received (S300:NO), the process performs a manual setting process for setting the setting information in S310, and the process proceeds to S320.

The process determines, in S320, whether a guidance start instruction is provided by a user. When it is determined that the guidance start instruction is provided (S320:YES), the process proceeds to S340. When it is determined that the guidance start instruction is not provided (S320:NO), the process returns to S310.

In S340, the process transmits guidance information. That is, the process transmits guidance information, such as the guidance sound, from the smart phone 30 to the in-vehicle apparatus 10.

Then, in S350, the process determines whether a transmission request for requesting a transmission of the setting information exists. This process corresponds to S110 of FIG. 2. When it is determined that the transmission request for requesting the transmission of the setting information exists (S350:YES), the process transmits the setting information to the in-vehicle apparatus 10 in S360, and the process proceeds to S370. When it is determined that no transmission request of the setting information exists (S350:NO), the process proceeds to S370 without performing process of S360.

The process then determines, in S370, whether the smart phone 30 is in a low battery condition (e.g., the charge level of the battery is below a critical threshold). When it is determined that the smart phone 30 is in a low battery condition (S370:YES), the process notifies the in-vehicle apparatus 10 that the smart phone 30 is in a low battery condition in S380, and the process proceeds to S390. When it is determined that the smart phone 30 is not in the low battery condition (S370:NO), the process proceeds to S390 without performing process of S380.

In S390, the process transmits the map image. That is, the process transmits the map image including the current position of the vehicle. By such process, the current position and the map image are regularly transmitted to the in-vehicle apparatus 10, and it leads to an affirmative determination in S200 of FIG. 3. At such time of transmission of the map image from the smart phone 30 to the vehicle, the scope of the transmitted map image is broader than the map image for the display on the in-vehicle display 20. Therefore, based on the current position and the traveling direction of the vehicle, the transmitted map image from the smart phone 30 may cover a larger area extending in the traveling direction of the vehicle. The traveling direction of the vehicle may be calculated based on the transition of the current vehicle position. In such manner, the map image on the traveling direction side, which may be used to display a map in the future even at a time of interruption of data communication between the smart phone 30 and the in-vehicle apparatus 10, can be stored in the vehicle in advance for a greater area and/or with a higher accuracy of map display. When the process of S390 is finished, the process returns to S340

The advantageous effects of the navigation system in the present embodiment are described in the following.

In the present embodiment, the ECU control unit 11 of the in-vehicle apparatus 10 requests the setting information from the smart phone 30 (FIG. 2, S110), and, in response, the SP control unit 31 of the smart phone 30 transmits the setting information to the in-vehicle apparatus 10 (FIG. 6, S350: YES, then S360). When the ECU control unit 11 receives the setting information from the smart phone 30 (FIG. 2, S120: YES), the process stores the setting information (S130).

By performing the forced termination determination process (FIG. 3, S230 to FIG. 4), the ECU control unit 11 may determine that a forced termination of the navigator application 33A is taking place (FIG. 3 S240:YES), and the process performs the resume process (FIG. 3 S250 to FIG. 5). In the resume process, after the restart of the navigator application 33A (FIG. 5, S251:YES), the setting information stored in the memory unit 16 is retrieved (S252), and the setting information is transmitted to the smart phone 30 (S253). In such manner, when the SP control unit 31 receives the setting information from the in-vehicle apparatus 10 (FIG. 6, S300: YES), the process performs the automatic setting process for setting the setting information (S330).

In other words, in the present embodiment, the process requests the setting information from the smart phone 30 in advance (FIG. 2, S110), and stores the setting information that has been transmitted from the smart phone 30 in the in-vehicle apparatus 10 in advance (S130). When the process determines a forced termination is occurring (FIG. 3, S240: YES), the process waits for the restart of the navigator application 33A (FIG. 5, S251), and transmits the stored setting information to the smart phone 30 (S252, then S253).

Therefore, the cooperation system, or the navigation system in the present embodiment, does not require the user to re-enter the setting information to the smart phone 30 after the navigator application 33A resumes operation, thereby decreasing a wait time to restart the route guidance. In other words, due to the reduction of the manual input of the setting information at the time of restart of the navigator application 33A, the system allows the user to have a secure and hassle-free continuation of the route guidance by using the smart phone 30.

Further, in the present embodiment, the ECU control unit 11 of the in-vehicle apparatus 10 displays the map image which has regularly been transmitted to the in-vehicle display 20 from the smart phone 30 (FIG. 3, S200:YES, then S210). Further, by pre-storing in the memory unit 16 the map image that may be used to display the map in the future (S220), such pre-stored map image is read (S254) and is used to display the map (S356) during a time between the forced termination and the resuming the operation of the navigator application 33A (FIG. 5, S251:NO). Therefore, the map image is continuously displayed during the resuming operation of the navigator application 33A, preventing the interruption of the route guidance due to the forced termination of the application 33a.

During the continuous display of the map image per the resume process, the map image is processed (S255) in the course of reading the image from the memory unit 16 (S254) in the present embodiment. Specifically, the map color is changed or the map image may have the superimposed message displayed thereon. In such manner, the user can readily/easily understand that the map image is a temporary one while the navigator application 33A is restarted to resume operation after the forced termination, thereby improving convenience of the user.

Further, before or while the navigator application 33A restarts to resume operation after the forced termination (FIG. 5, S251:NO), the current position of the vehicle is calculated (S257) and is displayed together with the map image (S258), until the navigator application 33A recovers from the forced termination. Specifically, based on the current position of the vehicle prior to the forced termination of the navigator application 33A, the vehicle speed information provided through the vehicle speed IF 14 and the gyro information provided through the gyro IF 15 are considered to calculate the current position of the vehicle by the dead-reckoning navigation (FIG. 5, S257). Therefore, an estimated/temporary current position is continuously displayed at the time of forced termination of the navigator application 33A, thereby providing the user a rough estimation of the current position of the vehicle and improving the user's convenience.

The display of such estimated current position is accompanied by a warning for the user/viewer, since the display of the estimated current position is only temporary. Specifically, the display of the estimated current position may be in a different display mode from a display of the current position during a normal operation of the navigator application 33A. For example, the display of the estimated current position may have a different color, a different side, a blinking display that is usually non-blinking, or the like, clearly showing a temporary and a non-normal operation of the device. Therefore, the display of the estimated current position indicates to the user that the displayed position of the vehicle may not be the actual vehicle position, since the position displayed is estimated and is not from the navigator application 33A of the smart phone 30. As a result, confusion related to whether the displayed position is the actual position is prevented, and safety during the restart of the navigator application 33A of the smart phone 30 is improved. Further, after the restart and normal operation of the navigator application 33A, the display mode is switched when the estimated position is replaced with the actual position to further prevent confusion of the user, thereby further improving to safety.

Further, in the present embodiment, when there is no response based on the navigator application 33A (S231:NO) and the communication link (i.e., coupling) is not interrupted (S232:NO) and the battery has a charge level above a critical threshold (S233:NO), is the in-vehicle apparatus 10 determines that a forced termination of the navigator application 33A is occurring. Therefore, the forced termination of the application program is adequately determined.

In an alternate configuration, the in-vehicle apparatus 10 may determine a forced termination of the navigator application 33A is occurring when the smart phone 30 is non-responsive despite uninterrupted communication coupling with the smart phone 30, or when the smart phone 30 is non-responsive despite a battery charge of the smart phone 30 being above a critical charge threshold.

Further, the following naming convention may be used in the claims: the smart phone 30 may be provided as "a portable terminal"; the navigator application 33A may be provided as "an application program"; the in-vehicle display 20 may be provided as "an in-vehicle display"; and the in-vehicle apparatus 10 and the smart phone 30 may be provided as "a navigation system" and "a cooperation system". The navigation function realized by the in-vehicle apparatus 10 and the smart phone 30 may be provided as "a predetermined function" in the cooperation system in claims.

Further, S110 of FIG. 2 of the present embodiment may be provided as "a setting information request unit" in claims, and S120 and S130 may be provided as "a setting information storage unit" in claims. Also, S231 to S235 of FIG. 4 may be provided as "a forced termination determination unit" in claims, and S251 to S253 of FIG. 5 may be provided as "a restart time transmission unit" in claims. Further, S350 and S360 of FIG. 6 may be provided as "an information transmission unit" in claims, and S300 and S330 may be provided as "a reset unit" in claims. Furthermore, S200 and S210 of FIG. 3 may be provided as "a map image display unit" in claims, S220 of FIG. 3 and S251, S255 to S258 of FIG. 5 may be provided as "a prefetch map image display unit" in claims.

Although the present disclosure has been fully described in connection with the preferred embodiment thereof with reference to the accompanying drawings, it is to be noted that various changes and modifications will become apparent to those skilled in the art.

For instance, in the present embodiment, the current position of the vehicle is estimated until the navigator application 33A recovers from the forced termination (FIG. 5, S251:NO) based on the pre-forced-termination current position, the vehicle speed information, and the gyro information, and determined by the dead reckoning navigation (S257 of FIG. 5). However, the in-vehicle apparatus 10 may use, as a temporary current position, a current position transmitted from the navigator application 33A immediately before the forced termination of the navigator application 33A. Such a position provides an estimated current position, which may be helpful for a user. Alternatively, until the navigator application 33A resumes operation from the forced termination (FIG. 5, S251: NO), the current position may not be displayed on the in-vehicle display 20.

In the present embodiment, the in-vehicle apparatus 10 requests the setting information from the smart phone 30 (FIG. 2, S110), and the smart phone 30 transmits the setting information in response (FIG. 6, S350:YES, then S360). However, the smart phone 30 may transmit the setting information to the in-vehicle apparatus 10 at a scheduled timing. For example, when it is determined that the guidance start instruction is provided in S320 of FIG. 6 (S320:YES), the setting information may be transmitted automatically. In such manner, the in-vehicle apparatus 10 may receive the setting information without specifically requesting it.

In the present embodiment, the in-vehicle apparatus 10 performs the forced termination determination process (S230) in the map display process (see FIG. 3). However, the smart phone 30 may determine the forced termination of the navigator application 33A. For example, the navigator application 33A may notify the in-vehicle apparatus 10 about the forced termination of the navigator application 33A itself, immediately before the forced termination.

In the present embodiment, a navigation function of the smart phone 30 is realized in the in-vehicle apparatus 10. However, the in-vehicle apparatus 10 may realize various applications of the smart phone 30, such as an audio function. For example, when the in-vehicle apparatus 10 realizes the audio function of the smart phone 30, a play list of music pieces to be played back may be pre-stored in the in-vehicle apparatus 10 as the setting information.

Such changes and modifications are to be understood as being within the scope of the present disclosure as defined by the appended claims.

What is claimed is:

1. A cooperation system comprising:
   an in-vehicle apparatus disposed in a vehicle and including a display unit; and
   a portable terminal communicably coupled with the in-vehicle apparatus, the portable terminal executing an application program to perform a function, the application program defining setting information, wherein
   the in-vehicle apparatus displays on the display unit information transmitted from the portable terminal based on execution of the application program by the portable terminal,
   the in-vehicle apparatus comprises:
      a setting information acquisition section acquiring, from the portable terminal, the setting information at a time of execution of the application program by the portable terminal;
      a setting information storage section storing the setting information acquired by the setting information acquisition section; and
      a restart time transmission section transmitting to the portable terminal the setting information stored by the setting information storage section when the in-vehicle apparatus determines a non-responsive condition of the application program and after a restart of the application program due to the non-responsive condition, and
   the portable terminal comprises:
      a setting information transmission section transmitting to the in-vehicle apparatus the setting information of the application program; and
      a reset section resuming the application program after the determination of the non-responsive condition and for storing the setting information transmitted from the in-vehicle apparatus, the reset section executing the application program to perform the function based on the setting information received from the restart time transmission section of the in-vehicle apparatus;
   wherein the application program of the portable terminal is non-responsive despite uninterrupted communication coupling with the portable terminal.

2. The cooperation system of claim 1, wherein the setting information transmission section of the portable terminal transmits at a predetermined timing the setting information to the in-vehicle apparatus when the setting information is defined.

3. The cooperation system of claim 1, wherein the in-vehicle apparatus further comprises:
   a setting information request section requesting the setting information from the portable terminal,
   the setting information transmission section of the portable terminal transmits the setting information to the in-vehicle apparatus in response to the request by the setting information request section, and
   the setting information acquisition section of the in-vehicle apparatus acquires the setting information transmitted from the portable terminal based on the setting information request section.

4. The cooperation system of claim 1, wherein the in-vehicle apparatus further comprises:
   a non-responsive condition determination section determining whether the non-responsive condition of the application program is occurring.

5. The cooperation system of claim 4, wherein the non-responsive condition determination section determines that the non-responsive condition is occurring when, based on the application program, the portable terminal is non-responsive.

6. The cooperation system of claim 5, wherein the non-responsive condition determination section determines that the non-responsive condition is occurring.

7. The cooperation system of claim 5, wherein the non-responsive condition determination section determines that the non-responsive condition is occurring when, based on the application program, the portable terminal is non-responsive despite a non-critical battery charge of the portable terminal.

8. The cooperation system of claim 1, wherein the portable terminal further comprises:
a non-responsive condition determination section determining whether the non-responsive condition of the application program is occurring.

9. The cooperation system of claim 1, wherein the non-responsive condition occurs when the application program crashes.

10. A navigation system comprising:
an in-vehicle apparatus disposed in a vehicle and including a display unit; and
a portable terminal communicably coupled with the in-vehicle apparatus, the portable terminal executing an application program to perform a navigation function, the application program defining setting information for executing the navigation function, wherein
the in-vehicle apparatus displays a map image and current position information transmitted from the portable terminal based on execution of the application program by the portable terminal,
the in-vehicle apparatus comprises:
a setting information acquisition section acquiring, from the portable terminal, the setting information at a time of execution of the application program by the portable terminal;
a setting information storage section storing the setting information acquired by the setting information acquisition section; and
a restart time transmission section transmitting to the portable terminal the setting information stored by the setting information storage section when the in-vehicle apparatus determines a non-responsive condition of the application program and after a restart of the application program due to the non-responsive condition, and
the portable terminal comprises:
a setting information transmission section transmitting to the in-vehicle apparatus setting information of the application program; and
a reset section resuming the application program after the determination of the non-responsive condition and for storing the setting information transmitted from the in-vehicle apparatus, the reset section executing the application program to perform the navigation function based on the setting information received;
wherein the application program of the portable terminal is non-responsive despite uninterrupted communication coupling with the portable terminal.

11. The navigation system of claim 10, wherein the setting information transmission section of the portable terminal transmits the setting information to the in-vehicle apparatus at a predetermined timing when the setting information is defined.

12. The navigation system of claim 10, wherein the in-vehicle apparatus further comprises:
a setting information request section for requesting setting information from the portable terminal,
the setting information transmission section of the portable terminal transmits the setting information that is already set by the application program to the in-vehicle apparatus in response to the request by the setting information request section, and
the setting information acquisition section of the in-vehicle apparatus acquires the setting information transmitted from the portable terminal based on the setting information request section.

13. The navigation system of claim 10, wherein the in-vehicle apparatus further comprises:
a map image display section displaying a map image transmitted from the portable terminal, and
a prefetch map image display section retrieving and displaying a pre-stored map image when the application program is resuming after the non-responsive condition, wherein during the display of the map image by the map image display section, the prefetch map image display section retrieves the pre-stored map image.

14. The navigation system of claim 13, wherein the prefetch map image display section processes the map image at least one of a storage time of the map image and a retrieval time of the map image to distinguish a pre-stored map image from a map image received when the application program is in normal operation.

15. The navigation system of claim 13, wherein the prefetch map image display section calculates a temporary current position and displays the temporary current position when displaying the pre-stored map image.

16. The navigation system of claim 15, wherein the temporary current position is a current position transmitted from the portable terminal before the non-responsive condition of the application program.

17. The navigation system of claim 15, wherein the temporary current position is a current position transmitted from the portable terminal before the non-responsive condition of the application program that has been updated by a dead reckoning navigation.

18. The navigation system of claim 15, wherein the temporary current position is displayed in a different display form that is different from a normal display form for displaying the current position at a time of normal operation of the application program.

19. The navigation system of claim 10, wherein the in-vehicle apparatus further comprises:
a non-responsive condition determination section determining whether the non-responsive condition of the application program is occurring.

20. The navigation system of claim 19, wherein the non-responsive condition determination section determines that the non-responsive condition is occurring when, based on the application program, the portable terminal is non-responsive.

21. The navigation system of claim 20, wherein the non-responsive condition determination section determines that the non-responsive condition is occurring.

22. The navigation system of claim 20, wherein the non-responsive condition determination section determines that the non-responsive condition is occurring when, based on the application program, the portable terminal is non-responsive despite a non-critical battery charge of the portable terminal.

23. The navigation system of claim 10, wherein the portable terminal further comprises:
a non-responsive condition determination section determining whether the non-responsive condition of the application program is occurring.

24. The navigation system of claim 10, wherein the non-responsive condition occurs when the application program crashes.

* * * * *